United States Patent [19]

Ashworth

[11] Patent Number: 4,646,485
[45] Date of Patent: Mar. 3, 1987

[54] WET BLAST APPARATUS

[75] Inventor: Terence I. Ashworth, Guernsey, Channel Islands

[73] Assignee: Vapormatt Limited, St. Sampson's Guernsey, Channel Islands

[21] Appl. No.: 687,847

[22] Filed: Dec. 31, 1984

[30] Foreign Application Priority Data

Jan. 21, 1984 [GB] United Kingdom ............... 8401652

[51] Int. Cl.$^4$ .............................................. B24C 7/00
[52] U.S. Cl. ........................................ 51/438; 51/425
[58] Field of Search ................. 51/425, 424, 264, 438

[56] References Cited

U.S. PATENT DOCUMENTS 1,519,250 12/1924 Gelstharp .............................. 51/264

OTHER PUBLICATIONS

Rothbart, Editor, Mechanical Design and Systems Handbook, 2nd Ed., McGraw-Hill, Inc. pp. 27.13, 27.14.

Primary Examiner—Frederick R. Schmidt
Assistant Examiner—Maurina Rachuba
Attorney, Agent, or Firm—Plante, Strauss & Vanderburgh

[57] ABSTRACT

Wet blast apparatus 1 is provided with a sump 2 for collecting liquid and abrasive particles after use, a duct 40 for conducting the collected material to a three-stage weir system 4 whereby the particles are separated out. The apparatus is further provided with a fluid flow control valve 3 operable to control the flow of collected material to the separating system 4. An adjustable timer 25 is provided for delaying the flow of collected material to the separating system 4. The control valve 3 comprises a valve member 6 cooperable with a valve seat 7, the valve member 6 being expansible whereby it can be enlarged so as to coact with the valve seat 7. The valve member 6 is of hollow, inflatable form, comprising a flexible membrane 10, clamped between a plate 11 and a ring 12. An actuating chamber 20 is defined by the plate 11 and the membrane 10. Pressurized air is admitted to, and exhausted from, the chamber 20 by way of a control valve 21 disposed in an air line 22. The control valve 21 is electrically operated, using a timer device 25 connected to the valve 21 by an electrical signal line 26. The timer device 25 is also electrically connected to an electrically-driven pump 27, used to discharge the slurry against the workpiece (not shown) to be treated by the apparatus 1. The timer 25 is operable to delay opening of the control valve 3, in order to allow abrasive time to settle in the sump 2.

9 Claims, 3 Drawing Figures

WET BLAST APPARATUS

BACKGROUND TO THE INVENTION

This invention relates to wet blast apparatus.

The invention has particular application to wet blast apparatus wherein a wet mixture or slurry of liquid having abrasive particles suspended therein is accelerated by air and discharged against a workpiece to be treated.

After use, the liquid and particles are collected and excess liquid removed by means of an overflow. However, the excess liquid inevitably carries abrasive particles, dirt, and stock material (hereinafter collectively referred to as abrasive particles). The finer the particles, the greater the carry-over.

SUMMARIES OF THE INVENTION

According to the invention, wet blast apparatus is provided with means for collecting liquid and abrasive particles after use, as well as means for conducting the collected material to separating means whereby abrasive particles are separated out, and further provided with a fluid flow control valve operable to control the flow of collected material to the separating means.

Means may be provided whereby the flow of collected material to the separating means may be delayed.

The fluid flow-control valve preferably comprises a valve member of hollow, inflatable form, cooperable with a valve seat, the valve member being distensible by inflation whereby it can coact with the valve seat.

The invention further comprises the fluid flow control valve set forth in the preceding paragraph per se.

BRIEF DESCRIPTION OF THE DRAWINGS

An embodiment of the invention will now be described by way of example only, with reference to the accompanying drawings, wherein:

FIG. 3 is a rear view, in perspective, of one of the containers 30 of FIG. 1.

DETAILED DESCRIPTION OF THE PREFERRED EMBODIMENT

Figure 1:
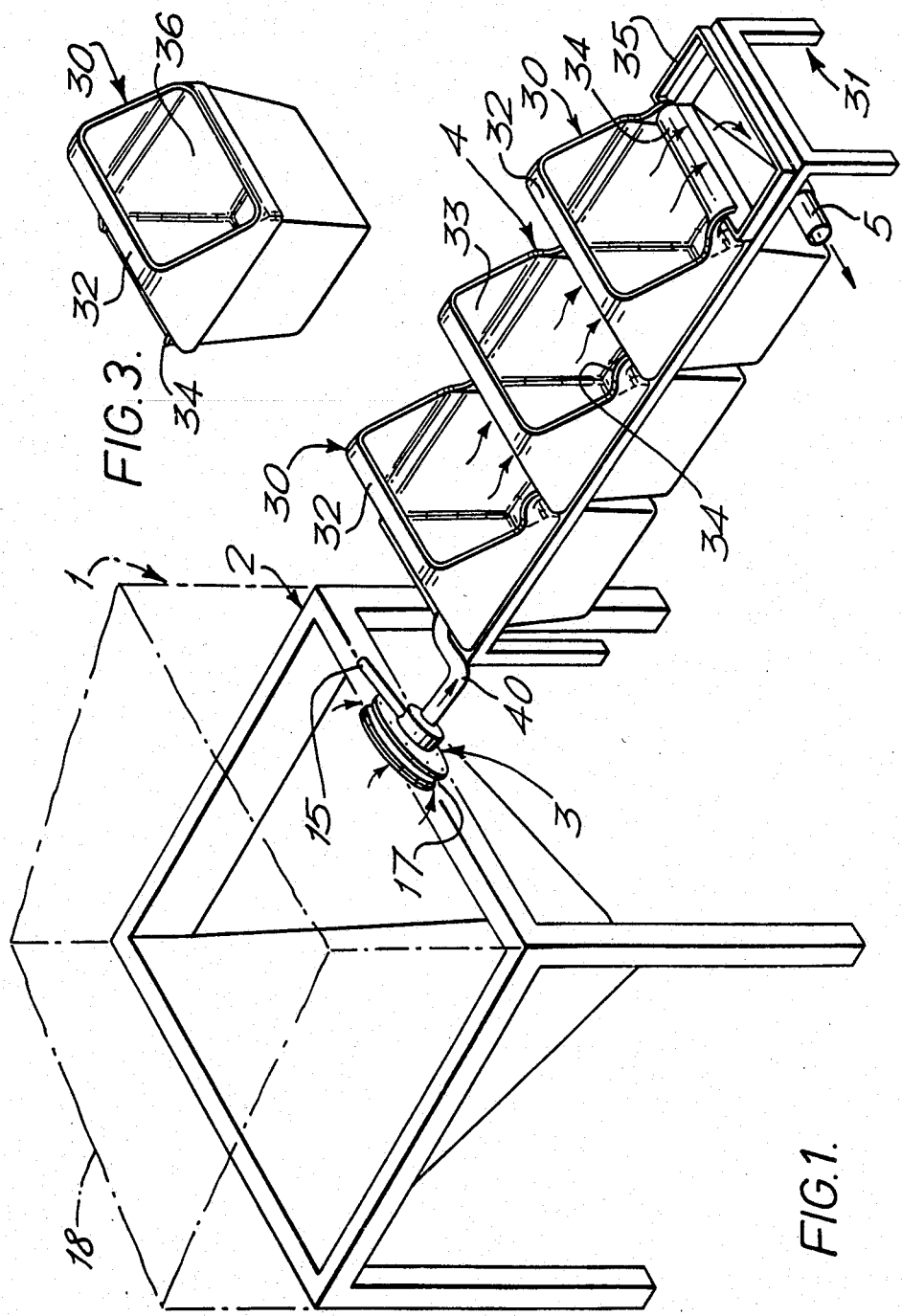
FIG. 1 is a view in perspective, of part of wet blast apparatus.

With reference to FIG. 1, wet blast apparatus 1 (of which only the sump 2 is illustrated in full lines) is provided with a fluid flow control valve 3 through which an overflow slurry of water with abrasive particles (as defined above) therein passes en route to a three-stage weir system 4. The weir system 4 is provided with a waste outlet pipe 5.

The slurry is accelerated by air and is discharged against a workpiece to be treated.

The apparatus 1 may be of the form disclosed by the article "A new approach to Vapourblasting" by T. Ashworth, published in the February 1981 issue of the journal "Product Finishing" (Sawell Publications Limited, London) and manufactured by Vapormatt Limited of St. Sampson's, Guernsey, Channel Islands.

A suitable cabinet for housing a blast-gun and associated equipment such as rubber gloves, enabling an operator outside the cabinet 18 to handle the blast-gun and the workpiece to be treated, has been disclosed by British Registered Design No. 988,338. (German Registered Design No. MR 15-449 corresponds). Herein, the cabinet is identified by reference numeral 18.

British Pat. No. 2,065,514 discloses a suitable blast-gun for discharging the slurry against a workpiece.

Figure 2:
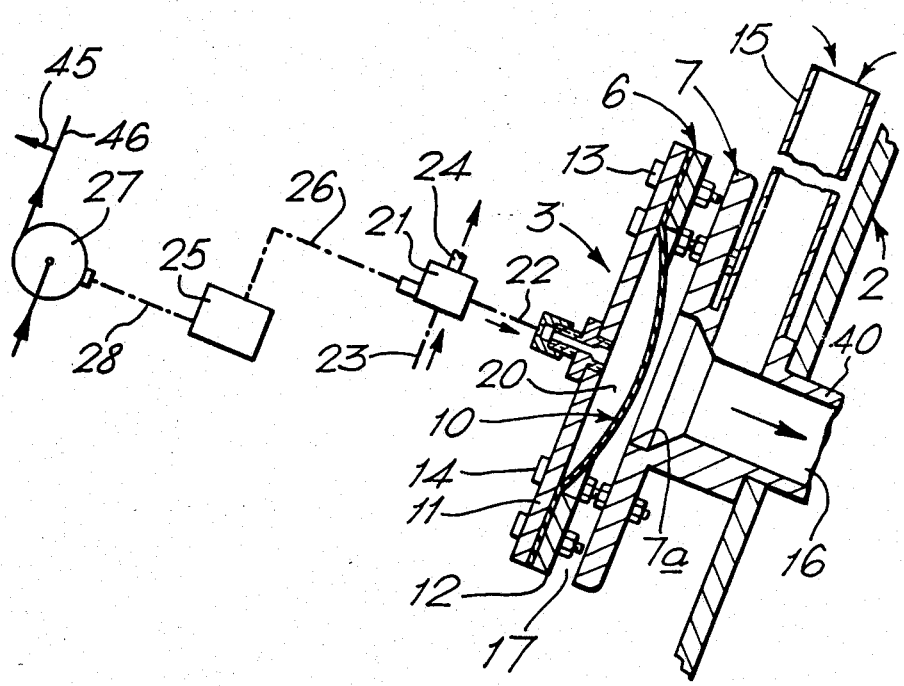
FIG. 2 is a side view, in medial section, and to an enlarged scale, of the fluid flow control valve of FIG. 1.

With reference to FIG. 2, the fluid flow control valve 3 comprises a control valve member 6 cooperable with a stationary valve seat member 7, the control valve member 6 being distensible whereby it can be enlarged so as to coact with the valve seat member 7.

The expansible control valve member 6 is of hollow, inflatable form, comprising a flexible membrane 10 of circular plan form. The periphery of the flexible membrane 10 is clamped between a plate 11 and a ring 12, by a ring of nut and bolt assemblies 13/14. The plate 11 is secured to, and is spaced from, the valve seat member 7 by the nut and bolt assemblies 14, each of which is disposed alternately between assemblies 13. The valve seat member 7 has a central bore 16 of stepped cross-section, viewed in side elevation. The inlet of the bore 16 defines the valve seat 7a proper of the valve seat member 7. The member 7 incorporates a safety overflow 15 which allows fluid to by-pass the valve seat 7a of the member 7, should the valve 3 be closed for long periods. Such closure would allow the level of slurry in the sump 2 to build up to a level whereby it can leak from a door provided for access to the interior of the cabinet 16. The inlet end of the overflow 15 is connected to the sump 2, at a level about 4 to 12 inches (0.10 to 0.305 meters) above the control valve 3.

The membrane 10 is an abrasive-resistant flexible diaphragm of urethane. The membrane 10, which is an elastomer, has a Shore hardness of 40–80.

The inlet of the control valve 3 comprises the annular opening 17 defined by the axial gap between the ring 12 and the valve seat member 7 and extending around the periphery of the valve seat 7a.

A valve member actuating chamber 20 is defined by the plate 11 and the adjacent, central, portion of the flexible membrane 10. Pressurised air is admitted to, and exhausted from, the chamber 20 by way of a control valve 21 disposed in an air line 22. The control valve 21 has an air inlet 23, as well as an exhaust line 24 which leads to atmosphere.

The control valve 21 is electrically operated, using a timer device 25 connected to the valve 21 by an electrical signal line 26. The timer 25 is also connected to an electrically-driven pump 27, by way of an electrical signal line 28. The pump 27 is used to discharge the slurry against the workpiece (not shown) to be treated by the wet blast apparatus 1. The timer 25 incorporates adjustable delay means.

Control valve 21 is a Type KMMS 11/10 pneumatic control valve obtainable from Kay Pneumatics Limited, of Dunstable, England. The timer device 25 comprises a Model STPNR delay-off timer available from Omron Tateisi Electronics Company of Japan.

The control valve 3 has a flexible outlet duct 40 whereby the valve discharges slurry to the weir system 4 of FIG. 1.

With reference once more to FIG. 1, the weir system 4 comprises three removable, basket-like containers 30, supported by a bench-like frame structure 31. The containers 30 each have a handle 32 enabling a container to be lifted away from its support structure 31.

The containers 30 also have front (33) and rear (36) openings. Only the front openings (33) can be seen in FIG. 1. FIG. 3 illustrates a container 30 with its rear opening 36. The front openings 33 incorporate lips or aprons 34 which serve as weirs, and which, in the case of the first two in line of the containers 30, overlap the rear openings (36) of the second and third containers, whereby the collected fluid can pass from container to container in a cascading manner without spillage. The lip 34 of the third container 30 is used to discharge slurry into a sump 35. The waste outlet 5 conducts liquid away from the sump 35. Slurry enters the first container 30 of the group by way of the flexible outlet duct 40.

Ideally, only water is discharged from the outlet pipe 5.

From time to time the containers 30 are lifted off the frame structure 31 and carried away for disposal of their contents.

When the wet blast apparatus 1 is in operation, the water/abrasive slurry collected in the sump 2 after use is agitated by a by-pass 45 (FIG. 2) connected to the pump discharge line 46, whereby the abrasive particles are kept in suspension. Additional water enters the sump 2 from sources such as wash nozzles and observation screen wipers.

The slurry is led away from the sump 2 by way of the control valve 3, the slurry flowing radially into the valve by way of the slot 17. The slurry carries abrasive particles; the finer the abrasive, the greater the carry-over.

Carry-over is at least reduced by the presence of the control valve 3 which is constructed so as to avoid trapping of abrasive particles, as well as sticking and clogging on the valve sealing faces.

The amount control valve 3 can open is adjustable, by varying the inflation pressure of air supplied to the chamber 20, whereby the volume of the chamber 20 is altered by movement of the membrane 10 towards and away from the valve seat 7.

In use of the wet blast apparatus 1, the control valve 3 is preferably caused to operate whereby the valve is wholly or almost completely closed but allowing the required outflow of slurry, without sticking or clogging of the valve sealing faces. After use of the apparatus 1, the pump 27 is stopped. The control valve 3 is then caused to open, allowing inflation air to vent to atmosphere by way of the exhaust line 24. The adjustable timer device 25 can be used to delay opening of the control valve 3, so as to allow abrasive time to settle in the sump 2.

When re-usable abrasive predominates in the slurry, the delay period can be short, say 30 seconds, but when unusable abrasive predominates, a longer delay period, (say 5 minutes), is preferred.

I claim:

1. Wet blast apparatus provided with means for collecting liquid and abrasive particles after use, separating means to separate said abrasive particles and liquid comprising a multi-stage weir system including an array of a plurality of interlocked and removable containers, each container providing a stage of said weir system and being provided with front and rear openings, each front opening incorporating a lip operable to overlap and interlock with the rear opening of an adjacent container, overflow means for conducting excess collected material to said separating means whereby abrasive particles are settled from said liquid, and a fluid flow control valve operable to control the flow of excess collected material to the separating means, said control valve comprising a valve inlet, and a valve outlet, a circular valve seat surrounding the valve outlet, and a fluid-actuated, circular diaphragm centrally positioned so as to be cooperable with the valve seat, fluid control means for actuating the diaphragm so as to open or close the valve.

2. Wet blast apparatus as claimed in claim 1 wherein said means for collecting liquid and abrasive particles includes sump means, and timing means operable to delay opening of said fluid control means and delay the flow of collected material to the separating means in order to allow said abrasive particles to settle in said sump means.

3. Wet blast apparatus as claimed in claim 1, wherein the separating means comprise a multi-stage weir system.

4. Wet blast apparatus as claimed in claim 1, wherein the separating means comprise a multi-stage weir system including a plurality of removable containers.

5. Wet blast apparatus as claimed in claim 1, wherein the fluid flow control valve comprises a valve member of hollow, inflatable form, cooperable with a valve seat, the valve member being distensible whereby it can coact with the valve seat.

6. Wet blast apparatus as claimed in claim 5, wherein the inlet to the fluid flow control valve comprises an annular opening extending around the periphery of the valve seat.

7. The wet blast apparatus as claimed in claim 1 including a bench frame structure for removably supporting said containers in said array.

8. The wet blast apparatus as claimed in claim 7 wherein each of said containers has an unbroken, continuous bottom, and a handle to permit lifting said containers from said frame structure and pouring of the contents from said containers.

9. The apparatus of claim 2 wherein said timing means is adjustable to provide a time delay from 0 to 5 minutes.

* * * * *